United States Patent [19]

Sano et al.

[11] 3,975,766

[45] Aug. 17, 1976

[54] COLOR TELEVISION RECEIVER

[75] Inventors: Shunichi Sano, Zama; Kohichi Kasahara, Yokohama, both of Japan

[73] Assignee: Tokyo Shibaura Electric Co., Ltd., Yokohama, Japan

[22] Filed: Apr. 29, 1975

[21] Appl. No.: 572,645

[30] Foreign Application Priority Data

June 25, 1974 Japan.............................. 49-72627

[52] U.S. Cl............................... 358/65; 315/13 C; 315/368
[51] Int. Cl.² ...................... H04N 9/28; H01J 29/50; H01J 31/00
[58] Field of Search............. 358/65; 315/13 C, 368; 313/DIG. 3, 412

[56] References Cited
UNITED STATES PATENTS

| | | | |
|---|---|---|---|
| 2,764,628 | 9/1956 | Bambara | 358/65 |
| 3,500,114 | 3/1970 | Sawai | 315/13 C |

*Primary Examiner*—John C. Martin
*Attorney, Agent, or Firm*—Finnegan, Henderson, Farabow & Garrett

[57] ABSTRACT

A color television receiver comprising a color television receiving tube which is provided with three horizontally arranged electron guns so designed as to emit three electron beams and cause said beams to be converged at a point outside of the fluorescent screen of the color television receiving tube; a deflection yoke fitted to the color television receiving tube and so constructed as to cause a horizontal deflection magnetic field created by said yoke to display a pincushion-shaped intensity distribution and a vertical deflection magnetic field produced thereby to present a barrel-shaped intensity distribution; and a delay circuit for causing at least two of the three primary color signals of color television which modulate the three electron beams to be successively delayed from the foremost one at the rate of a prescribed length of time corresponding to the intervening spacing of the three electron beams impinging on the fluorescent screen of the color television receiving tube.

5 Claims, 30 Drawing Figures

COLOR TELEVISION RECEIVER

This invention relates to a color television receiver, wherein the three electron beams separately modulated by the three primary color signals representing three red, green and blue primary colors are emitted in the horizontal direction of the color television receiver screen with their beam spots aligned in a straight line; and the reproduction of a color television image is effected by causing said three electron beams to scan the fluorescent screen of the color television receiving tube screen in both horizontal and vertical directions while being deflected by a deflection yoke.

This type of color television receiver is generally so arranged as to cause the three electron beams to be converged at a prescribed point on the fluorescent screen or shadow mask thereof. There will now be described by reference to a shadow mask type color picture tube now most widely accepted the manner in which the three electron beams emitted from the three electron guns are converged. Said three electron beams are made to concentrate at the small apertures of the shadow mask provided immediately behind the fluorescent screen, namely, at a position nearer to the electron guns. These shadow mask apertures are placed opposite to the dots of three red, green and blue primary color fluoroescent materials (including linear ones) regularly arranged on the inner wall of the face plate constituting the color picture tube. Therefore, three electron beams converged at the shadow mask apertures impinge on the prescribed fluorescent dots disposed behind said apertures.

The convergence of the three electron beams at a prescribed spot on the fluorescent screen is generally carried out by causing two side ones of the three electron guns to be inclined to the central one at a prescribed angle in the horizontal plane. However, the three electron beams emitted within an actually manufactured color picture tube do not always converge at a single point due to the errors occurring during the electron guns fabrication as well as various effects, for example, an external magnetic field. Therefore, the neck portion of the color television receiving tube is customarily fitted with a static convergence yoke for correction of the so-called static convergence. As the result, the three electron beams fully converge at least in the central portion of the screen. However, even a color television receiving tube wherein the above-mentioned static convergence has been corrected still has the drawback that where the three electron beams are deflected in both horizontal and vertical directions so as to attain the scanning of the peripheral portions of the television receiving tube screen, said three electron beams cease to be concentrated at a single point on the fluorescent screen because the three electron guns are spatially arranged and magnetic field of the deflection yoke is an astigmatic distribution. Namely, the three electron beams converge at a point in front of the fluorescent screen with respect to the peripheral portions of the fluorescent screen and impinge on said screen within a certain expanse. In the latter case, the electron beam spots (the points on the fluorescent screen at which the electron beams impinge) are displaced.

As means for correcting the displacement of the electron beam spots, therefore, it may be contemplated to reduce the diameter of the three electron guns and the spacing between the adjacent electron guns as much as possible so as to realize a condition approximating that in which three electron beams seem to be emitted as if from a single electron gun. However, adoption of such procedure would unavoidably decrease the caliber of the focusing lens of the electron guns to reduce the focusing quality, eventually failing to provide a reproduced image of high resolution. Accordingly, the above-mentioned procedure is naturally subject to certain limitations and presents difficulties in practical application. To date, therefore, displacement of the electron beam spots in the peripheral portions of the television receiving tube screen has generally been corrected by fitting not only the static convergence yoke, but also a dynamic convergence yoke to the neck portion of the color television receiving tube so as to attain the dynamic convergence by the latter yoke. This dynamic convergence consists in introducing dynamic convergence current through the dynamic convergence yoke in synchronization with scanning by the three electron beams, and slightly changing the trajectories of said electron beams according to the regions being scanned. This process enables three electron beams to be converged exactly at a prescribed point on the fluorescent screen of the color television receiving tube.

Where the above-mentioned dynamic convergence is attempted, the three electron beams present intricate and delicate changes in the spatial position. As the result, a control system or circuit arrangement which is intended purposely to give rise to slight changes in the positions of the three electron beams so as to bring them back to the desired convergent point becomes unavoidably complicated, consuming a considerable amount of power. Further, in the case of dynamic convergence, the incidence angle at which the three electron beams enter the shadow mask also changes as the result of correcting said dynamic convergence. To satisfy the color purity on the color television receiving tube screen, a correction device of complicated arrangement has to be used in exposing a fluorescent screen to light during its fabrication. The above-mentioned problems accompanying the dynamic convergence are assuming greater importance, as the image receiving tube of a color television receiver tends to have a broader deflection angle and the anode is supplied with higher anode voltage operation.

There will now be described concrete examples of these problems. A color television receiving tube with a 14-inch screen wherein the electron beams are deflected at an angle of 90° is provided with three adjustment points, whereas a broader angle color television receiving tube with a 20-inch screen wherein the electron beams are deflected at an angle of 110° is provided with as many as thirteen interrelated adjustment points. Where, therefore, a broad angle color television receiving tube with a large screen is manufactured, adjustment of electron beam convergence is a time-consuming work, considerably elevating the cost of said receiving tube. Further, where the used receiving tube of a color television receiver installed in a household is replaced by a new one, it is difficult to carry out the above-mentioned adjustments quickly and properly and in consequence to realize said replacement in the household.

The in-line type color television receiving tube wherein the three electron beams are convergently emitted from the three linearly arranged electron gun requires a relatively simpler circuit arrangement for dynamic convergence than the delta type color television receiving tube wherein the three electron beams are convergently emitted from the three delta arranged electron guns. Ideally, however, the color television receiving tube should be saved from the necessity of applying the above-mentioned dynamic convergence.

To meet this requirement, there have recently been proposed various forms of color television receiving tube which are intended fully to eliminate the necessity of carrying out dynamic convergence itself by optimizing the distribution of a magnetic field in a deflection device and minimizing errors occurring during manufacture. For example, the U.S. Pat. No. 2,764,628 sets forth a process of allowing three electron beams to be emitted from three horizontally parallel electron guns without being converged at a point on the fluorescent screen of the television receiving tube, carrying out scanning by said electron beams just as emitted, and delaying the three primary color signals modulating said electron beams for a length of time corresponding to the intervening spacing of the three parallel discharged electron beams, thereby eliminating the displacement of three primary color images of a color television image. The process proposed in the above-mentioned United States patent is practically available only when a deflection magnetic field created by the deflection yoke is not subject to any distortion. Since, however, it is impossible fully to eliminate the distortion of a deflection magnetic field created by a deflection yoke now in actual use, said U.S. patent process can not be put to practical application. This U.S. patent further states that to shorten the delay time, the two side ones of the three electron beams may be inclined inward, but that this procedure is not desired due to the scanning raster being distorted.

The Japanese Patent Publication No. 30,861, 1971 proposes another process of eliminating the above-mentioned difficulties which consists in causing a horizontal deflection magnetic field produced by a horizontal deflection coil to display a pincushion-shaped distribution and a vertical deflection magnetic field generated by a vertical deflection coil to indicate a barrel-shaped distribution, thereby shifting the convergence point of the three electron beams impinging on to the fluorescent screen of said screen on the peripheral portions of a color television receiving tube screen. However, the present inventors' experiments show that the process of said Japanese Publication is only effective when the three electron guns are arranged at a narrow spacing and the two side ones are deflected from the central one at an angle of 90°, but that where the two side electron guns are deflected from the central one at an angle of 110° or over, then an incorrect convergence of electron beams takes place. Moreover, the process of said Japanese Publication has the drawback that the narrow spacing of the three electron guns unavoidably reduces the focusing quality of the three electron beams.

It is accordingly the object of this invention to provide a color television receiver of simple arrangement which eliminates the necessity of applying the dynamic convergence customarily practised in the past and yet displays substantially the same effect as when the entire television receiving tube screen is subjected to the dynamic convergence, and prevents the focusing quality of the three electron beams from being decreased, thereby easily providing a very distinct color television image.

The above-mentioned object is attained by providing a color television receiver comprising a color television receiving tube which is provided with three horizontally arranged electron guns so designed as to emit three electron beams and cause said beams to be converged at a point outside of the fluorescent screen of the color television receiving tube; a deflection yoke fitted to the color television receiving tube and so constructed as to cause a horizontal deflection magnetic field with created by said yoke to display a pincushion-shaped intensity distribution and a vertical deflection magnetic field with generated thereby to indicate a barrel-shaped intensity distribution; and a delay circuit for causing at least two of the three primary color signals of color television which modulate the three electron beams to be successively delayed from the preceding one for a prescribed length of time corresponding to the intervening spacing of the three electron beams impinging on the fluorescent screen of the color television receiving tube.

To realize the above-mentioned object, the color television receiver of this invention uses a color television receiving tube, namely, a Braun tube which contains three electron guns linearly arranged in the horizontal direction of the Braun tube screen and so designed as to converge three electron beams emitted from said electron guns to be converged at a point outside of the fluorescent screen of the Braun tube. As the result, the three electron beams impinge on the fluorescent screen of the Braun tube with the impingement spots equidistantly aligned in a straight line in the horizontal direction of the Braun tube screen. The intervening spacing of the impingement spots of the three electron beams, namely, the electron beam spots, remains substantially the same both in the central portion of the fluorescent screen of the Braun tube and in the peripheral portions of said fluorescent screen when the three electron beams are deflected in the horizontal direction. The reason is that a distance between the forward end of each electron gun and the convergence point of the three electron beams emitted therefrom can be allowed to be fully longer than in the prior art Braun tube. In other words, the Braun tube used in the color television receiver of this invention is the type wherein the convergence point of three electron beams is set outside of said Braun tube, thereby minimizing changes in the intervening spacing of the three electron beam spots on the fluorescent screen of the Braun tube with respect to both central and peripheral portions of said fluorescent screen to such an extent as can be hardly recognized by the naked eye.

Further to attain the aforesaid object, the deflection yoke producing a deflection magnetic field which is used in the color television receiver of this invention is the type wherein the intensity of the magnetic field created by a horizontal deflection coil presents a pincushion-shaped distribution in which the intensity of the magnetic field is increasingly intensified as said field is more removed from the axis of the deflection yoke in the horizontal (right to left) direction, and also the intensity of the magnetic field generated by a vertical deflection coil indicates a barrel-shaped distribution in which the intensity of the magnetic field becomes weaker as said field is set more apart from the axis of the deflection yoke in the vertical (upper to lower) direction. Where a deflection yoke arranged as described above is used, then the loci of three deflected electron beams on the fluorescent screen of the Braun tube are equidistantly aligned in a horizontal straight line with respect to the horizontal line portions of a color television image and present three vertical almost equidistantly spaced straight lines with respect to the vertical line portions of said image.

In contrast, where the three electron beams are deflected by the prior art deflection yoke, the loci of the forward ends of the three deflected electron beams are distorted because the electron-emitting ends of the electron guns are set apart. The present inventors have carried out various experiments with attention paid to the above-mentioned two facts, and as the result discovered that where the distribution of a magnetic field created by the deflection yoke is purposely distorted in advance to present the above-mentioned pincushion- and barrel-shape, then the loci of the forward ends of the three electron beams deflected for scanning are aligned into a horizontal straight line with respect to the horizontal line portions of a color television image and indicate three vertical almost equidistantly spaced straight lines with respect to the vertical line portions of said image no matter how the electron beam spots are shifted in the horizontal direction of the fluorescent screen. As previously described, the deflection yoke used with the color television receiver of this invention is the type wherein a magnetic field produced by the horizontal deflection coil shows a pincushion-shaped distribution and a magnetic field created by the vertical deflection coil presents a barrel-shaped distribution. Accordingly, the horizontal portions of color television images resulting from scanning by the three electron beams can be superposed on each other with the displacement of these three primary color images minimized to such extent as can be little recognized by the naked eye.

To attain the above-mentioned object, a color television image signal circuit used in this invention is provided with a delay device for successively delaying at least two of the three primary color signals separately modulating the three electron beams from the preceding one for a prescribed length of time corresponding to the intervening spacing of the three electron beam spots on the fluorescent screen of the Braun tube. While passing over one group of three primary color fluorescent dots, the three electron beams are subjected to the required modulation. Thus three primary color images derived from scanning by the three electron beams are properly superposed on each other. Namely, the above-mentioned image signal circuit causes at least two of the three primary color signals modulating the three electron beams to be successively delayed from the preceding one for a prescribed length of time corresponding to the intervening spacing of the three electron beams, thereby enabling the vertical portions of color television images resulting from scanning by three electron beams to be superposed on each other with the displanement of three primary color images minimized to such extent as can be hardly detected by the naked eye.

As mentioned above, the color television receiver of this invention is characterized by the color television receiving tube, deflection yoke and image signal circuit which are all specifically designed, thereby eliminating the necessity of applying the dynamic convergence practised in the past and yet attaining the same result as when the entire fluorescent screen of the color television receiving tube is subjected to good dynamic convergence. With the color television receiver of the invention, the intervening spacing of the forward ends of three electron beams emitted from the three electron guns need not be shortened, making it unnecessary particularly to reduce the caliber of the electron guns. This has the advantage of preventing the focusing quality of the three electron beams from being decreased and easily providing a color television image of good picture quality.

Further as previously described, the loci of the forward ends of the three electron beams on the fluorescent screen of the color television receiving tube are aligned in a horizontal straight line with respect to the horizontal line portions of a color image and present three vertical almost equidistantly spaced straight lines with respect to the vertical line portions of said image, no matter how the electron beam spots are shifted in the horizontal direction of the fluorescent screen. Therefore, if the delay time of at least two of the three primary color signals is exactly the same both in the central and peripheral portions of the fluorescent screen, then it will well serve the purpose. Accordingly, the image signal circuit used in this invention does not require at all such complicated circuit arrangement as is used in applying the prior art dynamic convergence, but has only to be the type provided with a delay circuit carrying out a prescribed fixed amount of delay, thus making it possible to simplify the arrangement of said image signal circuit and facilitate general adjustment work. It will be noted that the above-mentioned fixed delay circuit does not mean the type which does not admit of any variation of delay time permanently, but the type which provides a certain fixed delay time during operation. Accordingly, the fixed delay circuit of this invention is the type which temporarily fixes the delay time, even though provided with a delay time-varying device.

This invention can be more fully understood from the following detailed description when taken in conjunction with the accompanying drawings, in which:

FIG. 1 schematically illustrates the arrangement of a shadow mask type color television receiving tube according to an embodiment of this invention as well as of a three primary color signal generator coupled therewith;

FIG. 2 shows the relationship between the inclination angle of electron beams used in said embodiment and various factors associated with said inclination angle;

FIG. 3 sets forth the loci of the forward ends of the three electron beams on the fluorescent surface of the color television receiving tube screen of said embodiment;

FIG. 4 is a front view of a vertical deflection coil used in said embodiment;

FIG. 5 indicates the properties of the vertical deflection coil of FIG. 4;

Figure 1:
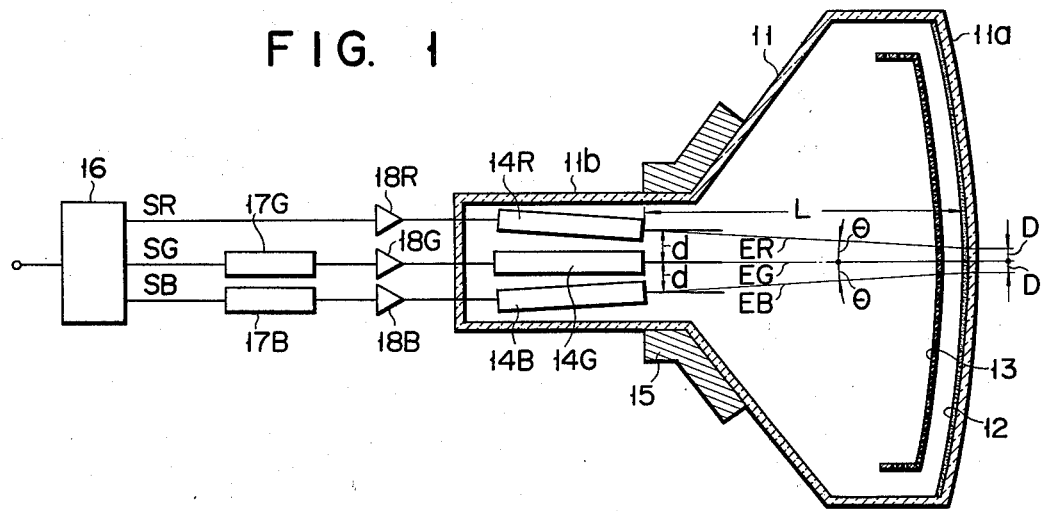
Figure 12:
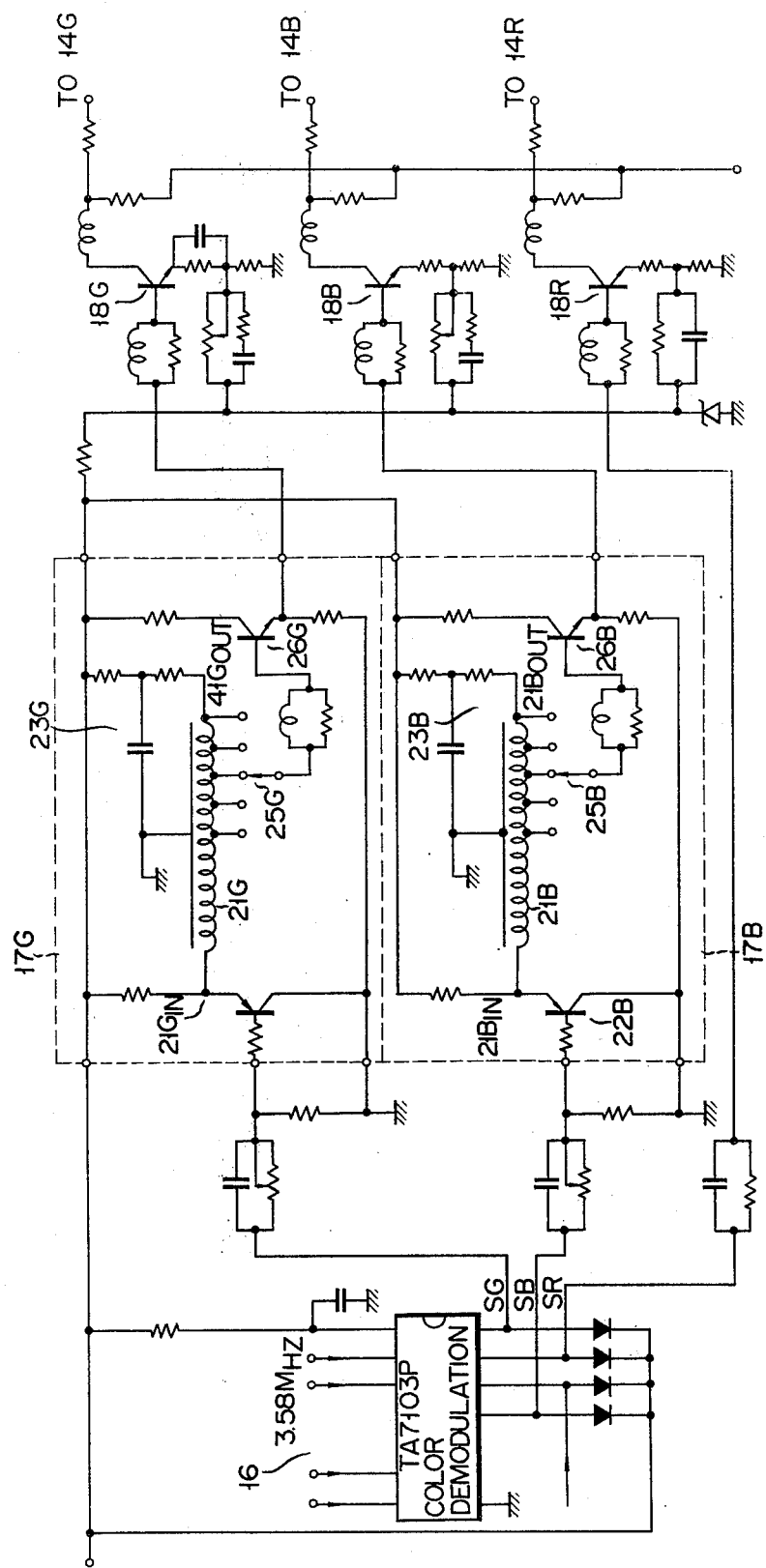
Figure 13:
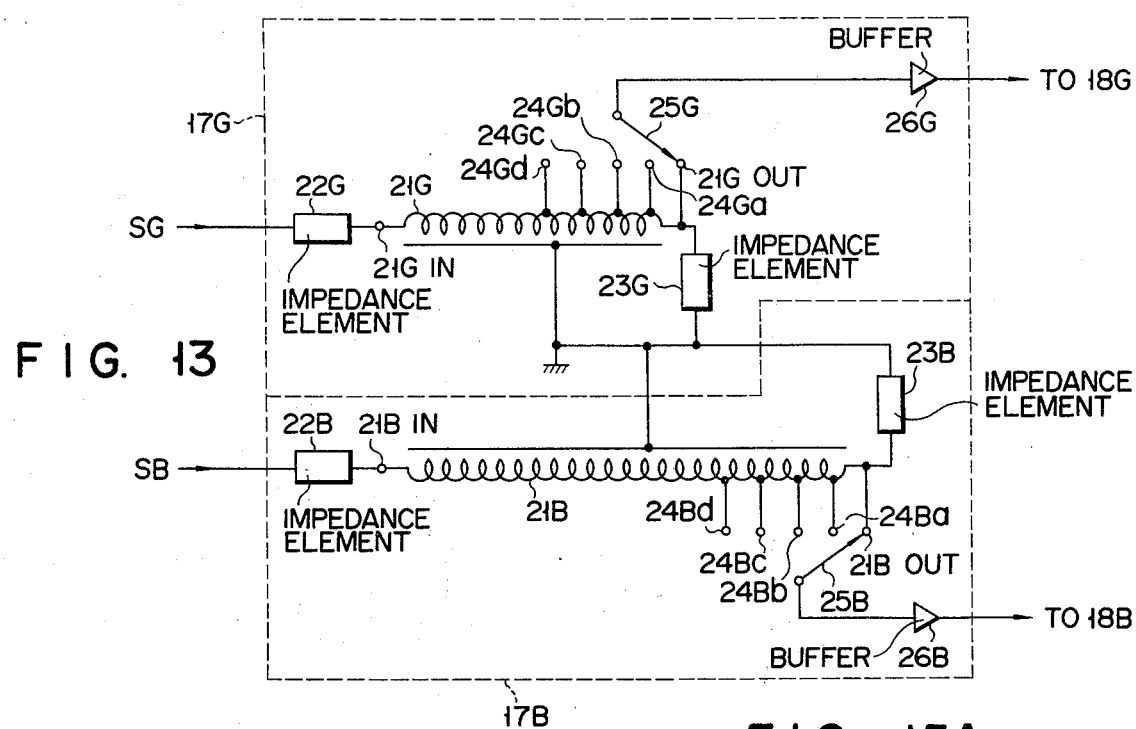
Figure 14A:
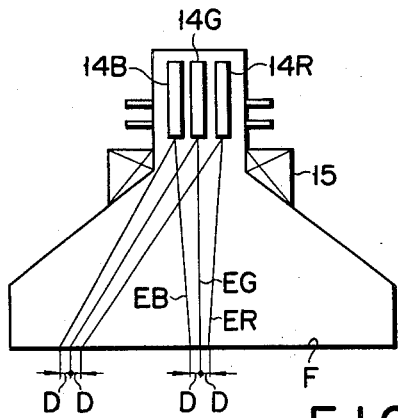
Figure 15A:
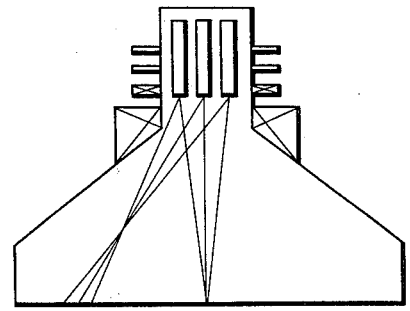
Figure 14B:
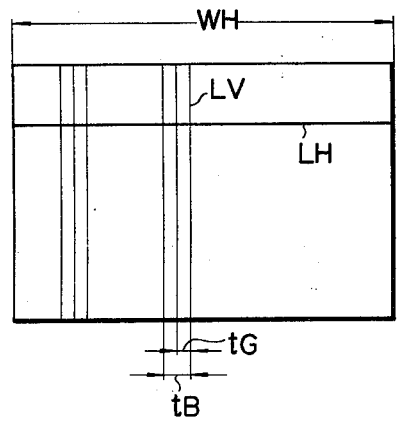
Figure 15B:
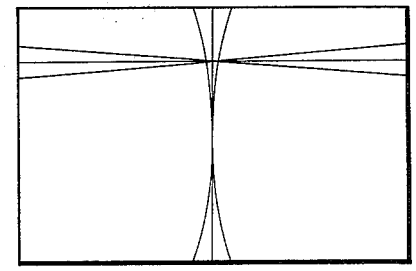
Figure 14C:
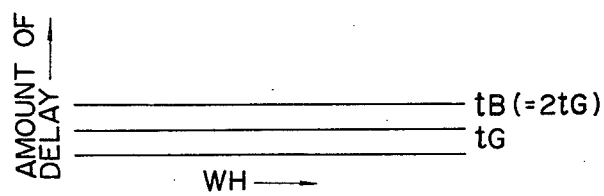
Figure 16:
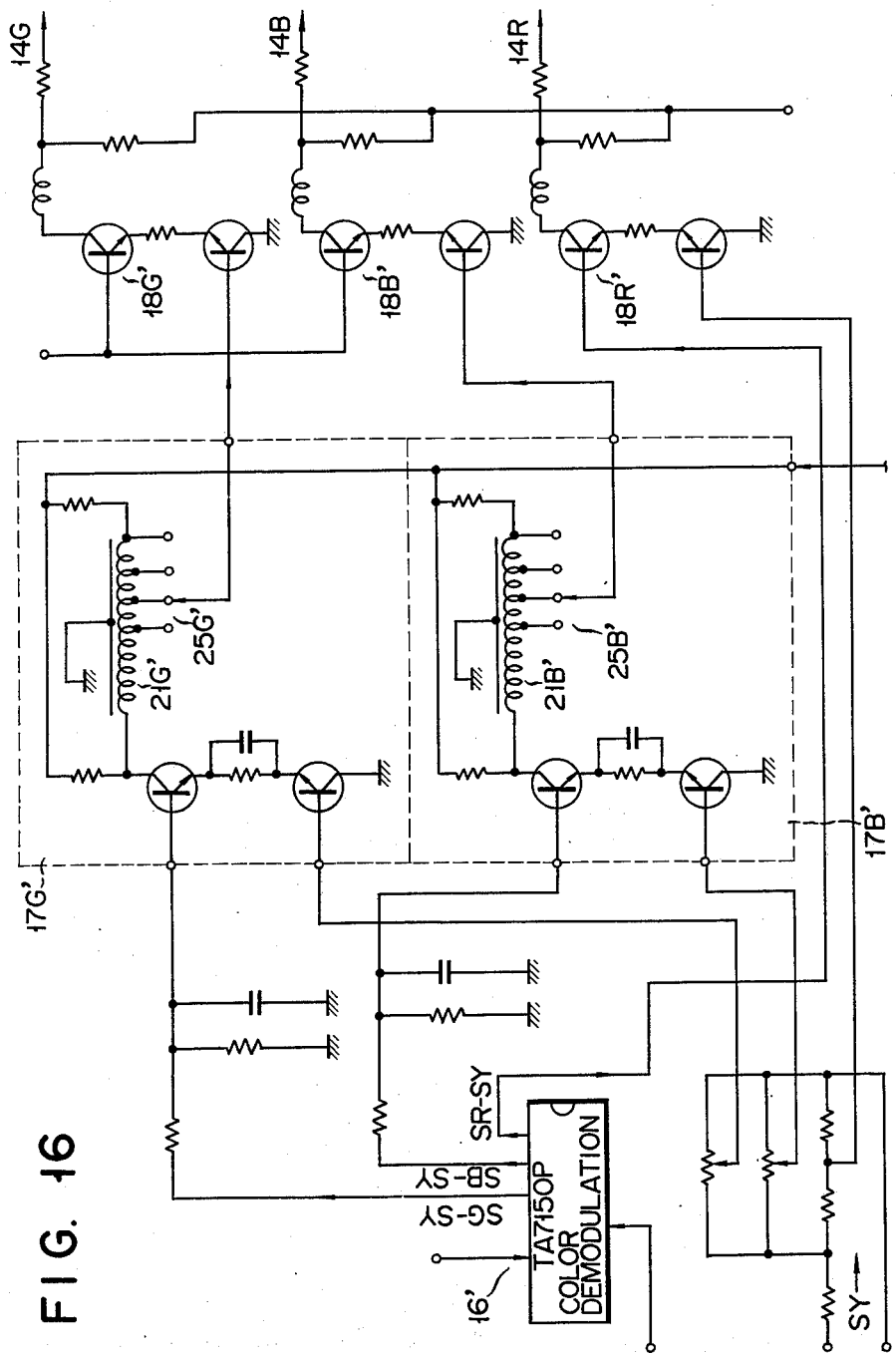

FIG. 12 presents the concrete arrangement of the primary color signal generator of FIG. 1;

FIG. 13 shows a fractional arrangement of the delay circuit of FIG. 12 with part thereof simplified;

FIGS. 14A to 14C are illustrations of the operation of said embodiment;

FIGS. 15A and 15B set forth the operation of the prior art Braun tube opposite to that of FIGS. 14A and 14B respectively;

FIG. 16 shows a concrete arrangement of a primary color signal generator according to another embodiment; and FIGS. 17 to 25 are diagrams of various delay circuits according to other embodiments.

FIG. 1 schematically sets forth the construction of a shadow mask type color television receiving tube according to an embodiment of this invention as well as of a three primary color signal generator coupled therewith. Referring to FIG. 1, a glass bulb 11 is an evacuated vessel having a face plate 11a disposed at the front to constitute the image screen of a color television receiver and a neck portion 11b positioned at the rear. The inner wall of the face plate 11a is fitted with a fluorescent membrane 12 on which there are regularly arranged fluorescent dots emitting the three color television primary colors of red (R), green (G) and blue (B) when the three electron beams impinge thereon. Slightly set apart from the surface of the fluorescent membrane 12 toward the electron beam emission side is a shadow mask 13 perforated with numerous fine apertures (not shown) so arranged as to face the fluorescent dots. Three electron guns 14R, 14G, 14B are provided in the neck portion 11b of the glass bulb 11. These electron guns 14R, 14G, 14B are linarly set in the horizontal direction (namely, in an in-line arrangement). These electron guns 14R, 14G, 14B are designed to emit three electron beams ER, EG, EB modulated by the later described three primary color signals SR, SG, SB on to the fluorescent membrane 12.

The two side ones 14R, 14B of said three electron guns 14R, 14G, 14B are inclined at a prescribed angle $\theta$ toward the central one 14G in the horizontal plane, such that the three electron beams ER, EG, EB converge at a point outside of the fluorescent membrane 12, namely, the face plate 11a. The three electron beams ER, EG, EB whose convergence point falls outside of the fluorescent membrane 12 impinge thereon at a spacing of D. Said spacing D naturally varies not only with the inclination angle $\theta$ of the electron beams 14R, 14G, 14B and a distance d between the central points of the adjacent ones of the electron beam-emitting ends of the three electron guns 14R, 14G, 14B, but also a distance between said electron beam-emitting ends of the electron guns 14R, 14G, 14B and the fluorescent membrane 12. The relative positions of these parts which assume a great importance for attainment of the object of this invention are desired to be so defined as to satisfy the following formula:

$$\frac{d}{6} < d - L\theta < \frac{d}{2} \qquad (1)$$

Namely, a difference $d - L\theta$ between a product $L\theta$ arrived at by multiplying the inclination angle $\theta$ (rad.) defined by the two side electron beams ER, ER with the central electron beam EG and a distance $d$ (mm) between the adjacent ones of the electron-emitting ends of the three electron guns 14R, 14G, 14B should be chosen to be larger than $d/6$ and smaller than $d/2$. Following is the reason. If said difference $d - L\theta$ is smaller than $d/6$, then the intervening spacing of the three electron beam spots in the central portion of the fluorescent screen will widely vary from the similar intervening spacing in the peripheral portions of said fluorescent screen. Under such condition, mere provision of the later described delay means would fail to attain a spatial coincidence between the color images derived from scanning by the three electron beams ER, EG, EB. Conversely, if the above-mentioned difference $d - L\theta$ is larger than $d/2$, then mere provision of the later described specifically designed deflection yoke used in this invention would be insufficient to enable the loci of the forward ends of the three electron beams ER, EG, EB on the fluorescent surface to be aligned in a straight line in the horizontal direction of said surface with respect to the horizontal line portions of a color television image and further prevent the intervening spacing between the adjacent ones of the loci of the forward ends of said electron beams ER, EG, EB from varying according as the electron beam spots are shifted in the horizontal direction of the fluorescent screen.

Figure 2:
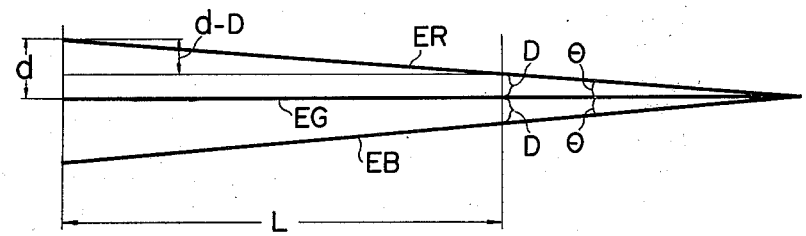

The term $d - L\theta$ given in the above formula (1) is approximately equal to the intervening spacing of the three electron beam spots on the fluorescent membrane 12. As seen from FIG. 2, $\tan \theta = (d-D)/L$ leads to $D \approx d - L\theta$. To obtain a color television image of high resolution $d$ should fall within the range of $$6.5 \text{ mm} < d < 9.5 \text{ mm}$$

and D should be chosen to be $$1 \text{ mm} < D < 5 \text{ mm}$$

for the fluorescent screen of a Braun tube screen having a size of 14 to 25 inches.

A Braun tube manufactured according to this invention for experimental purpose had the following measurements for the respective factors:

| | |
|---|---|
| Size of fluorescent surface | 20 inch |
| Deflection angle of electron beams | 110° |
| Outer diameter of the neck portion | 36.5 mm |
| Inclination angle $\theta$ of electron beams | 1.06° |
| Distance L between the beam-emitting end of each electron gun and fluorescent membrane | 280 mm |
| Intervening spacing of the beam-emitting ends of three electron guns | 8.2 mm |
| Intervening spacing D of three electron beam spots on the fluorescent screen | 2.5 mm |
| Distance between the fluorescent membrane and the focal point of the three electron beams | 160 mm |

The above-mentioned Braun tube was prepared from the RIS type glass bulb manufactured by Tokyo Shibaura Electric Company Limited.

A deflection yoke 15 is fitted around the periphery of the neck portion 11b of the glass bulb 11 of FIG. 1. This deflection yoke 15 is provided with horizontal and vertical deflection coils for creating magnetic fields to carry out the horizontal and vertical deflections of the three electron beams ER, EG, EB. The horizontal deflection coil is so designed as to generate a magnetic field whose intensity distribution presents the so-called pincushion shape, in which the intensity of the magnetic field gradually decreases as said field is more removed from the axis of the deflection yoke 15 in the horizontal direction. The vertical deflection coil is so designed as to generate a magnetic field whose intensity distribution sets forth the so-called barrel shape, in which the intensity of the magnetic field progressively falls, as said field is set more apart from the axis of the deflection yoke 15 in the vertical direction.

Figure 3:
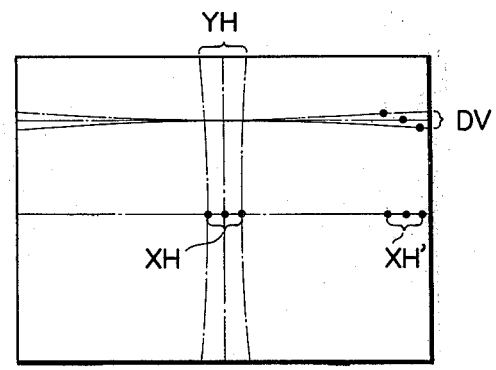

The principal reason for adoption of a deflection yoke presenting the above-mentioned distributions of magnetic fields is that where the three electron beams ER, EG, EB are deflected in both horizontal and vertical directions, the loci of the forward ends of said three electron beams ER, EG, EB on the fluorescent screen 12 are desired, as previously mentioned, to be aligned in a straight line in the horizontal direction of said screen 12 with respect to the horizontal line portions of a color television image and also present three almost equidistantly spaced straight lines in the vertical direction of said screen 12 with respect to the vertical line portions of said image. To prevent displacement of the primary color images of a color television, however, it is not always necessary to cause the loci of the forward ends of the three electron beams ER, EG, EB to be aligned in a straight line in the horizontal direction of the fluorescent screen. The point is that where a magnetic field created by the horizontal deflection coil is desired to present a pincushion shape distribution and a magnetic field produced by the vertical deflection coil is demanded to display a barrel shape distribution, then the loci of the forward ends of the three electron beams ER, EG, EB should meet two requirements that where scanning is carried out in both horizontal and vertical directions by deflecting the three electron beams ER, EG, EB, the intervening spacing of the three electron beam spots be fixed during the same delay time with respect to the synchronizing pulse for horizontal scanning, no matter how said electron beam spots are shifted during the vertical scanning and that the intervening spacing of the three electron beams be saved from any deviation during the same delay time with respect to the synchronizing pulse for vertical scanning, no matter how said electron beam spots are shifted during the horizontal scanning. In other words, it is demanded that referring to FIG. 3, the width YH jointly defined by the three electron beam spots ER, EG, EB on both upper and lower sides of the fluorescent screen be equal to the width XH jointly defined by said electron beam spots on a horizontal line passing through the center of the fluorescent screen and that the width jointly defined by said electron beam spots on both left and right sides of the fluorescent screen be saved from any deviation in the vertical direction. The referential character XH' of FIG. 3 denotes the width jointly defined by said electron beams on both left and right sides of the fluorescent screen. A difference between this width XH' and the aforesaid width XH, namely, a value of XH - XH' has no direct relationship with the above-mentioned requirements for the loci of the forward ends of the three electron beams ER, EG, EB. However, this difference XH - XH' assumes great importance when an attempt is made to attain a spatial coincidence between the color television images derived from scanning by the three electron beams ER, EG, EB by delaying, as later described, some of the three primary color signals for a prescribed length of time. Though, as apparent from the description of the intervening spacing D of the three electron beam spots, the above-mentioned difference XH - XH' can be substantially reduced to zero by setting the focal point of the three electron beams ER. EG, EB outside of the color television receiving tube, yet said difference XH - XH' is still affected by a deflection magnetic field. Therefore, full consideration should be given to this fact in manufacturing the deflection yoke 15.

Figure 4:
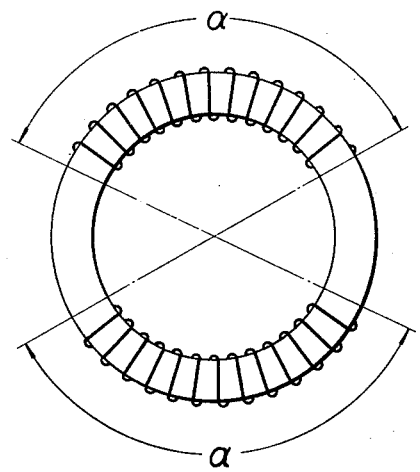
Figure 5:
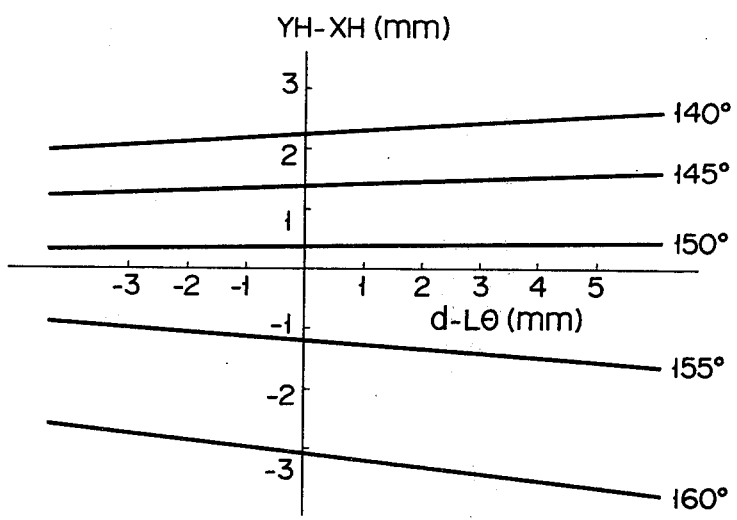

The present inventors have carried out various experiments and studies in an attempt for development of a deflection yoke capable of satisfying the above-mentioned requirements, and as the result discovered the fact that where determination was made of the distributions of magnetic fields created by a deflection yoke provided with a horizontal deflection coil of the saddle type and a vertical deflection coil of the toroidal type when fitted to the prior art color television Braun tube so designed as to cause the three electron beams ER, EG, EB to converge on the fluorescent screen of said tube, then the horizontal deflection magnetic field presented an approximately pincushion-shaped distribution, while the vertical deflection magnetic field showed a nearly barrel-shaped distribution. It was also disclosed that changes in the intervening spacing of the three electron beam spots during the vertical scanning was mainly affected by the distribution of a magnetic field produced by the vertical deflection coil. It was further found that the tendency of the vertical deflection magnetic field to present a barrel shape was prominently affected by the magnitude of the winding angle $\alpha$ (FIG. 4) of the toroidal type vertical deflection coil. Determination was made of variations in a difference between the width YH jointly defined by the three electron beam spots and the width XH jointly defined by said spots (FIG. 3), the results being set forth in FIG. 5. It will be noted that $d - L\theta$ representing the abscissa of FIG. 5 is half the value of the width XH. As apparent from FIG. 5, where the winding angle $\alpha$ of the vertical deflection coil indicates $153° \pm 3°$, then a difference between the abovementioned two widths YH, XH is reduced to a minimum, regardless of the value of $d - L\theta$. To eliminate the deviation DV of FIG. 3, the present inventors attempted various forms of winding on a horizontal deflection coil of the saddle type with respect to a deflection yoke consisting of said horizontal deflection coil and a vertical deflection coil of the toroidal type, the winding angle $\alpha$ of which was set at $153° \pm 3°$. As the result, it was found that to attain the abovementioned object, it would be advisable to widen the hollow portion of a horizontal deflection coil so far regarded as the standard by unwinding fifteen of the total number of turns constituting said coil. Further, measurement was made of the distribution of a magnetic field generated by a deflection yoke formed by combining a vertical deflection coil of the toroidal type whose winding angle $\alpha$ was set at $153° \pm 3°$ with said horizontal deflection coil so far regarded as the standard whose hollow portion was broadened by unwinding 15 of the total number of turns of said coil, the results being set forth in FIGS. 6A and 6B. These figures are curve diagrams showing the distribution of a magnetic field created by a horizontal deflection coil. In this case, the position of the deflection yoke 15 shifting from its axis in the radial or horizontal (or left to right) direction is plotted on the abscissa, the intensity (relative value) of a magnetic field produced by said coil is plotted on the ordinate, and the position of the deflection yoke 15 shifting in the axial or Z axis direction is taken as a parameter. Throughout FIGS. 6A and 6B a numeral $Z = 0$ (mm) indicates the neutral position on the Z axis of the forward end of the horizontal deflection coil. The position of said coil ahead of the first mentioned position (facing the fluorescent membrane) is denoted by a positive value. The position of said coil behind the first-mentioned position (on the opposite side of the fluorescent membrane) is shown by a negative value. In this case, the rear end of said coil takes a position of −80 mm.

Figure 6B:
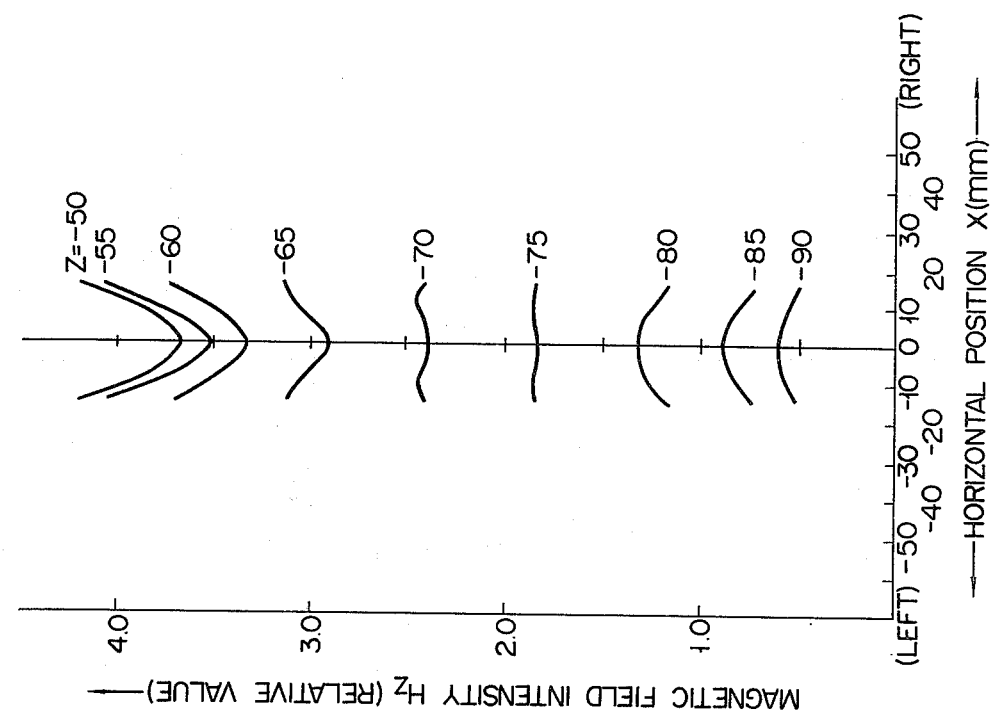
FIGS. 6A and 6B are curve diagrams of the distributions of deflection magnetic fields created by a horizontal deflection coil used in said embodiment.
Figure 6A:
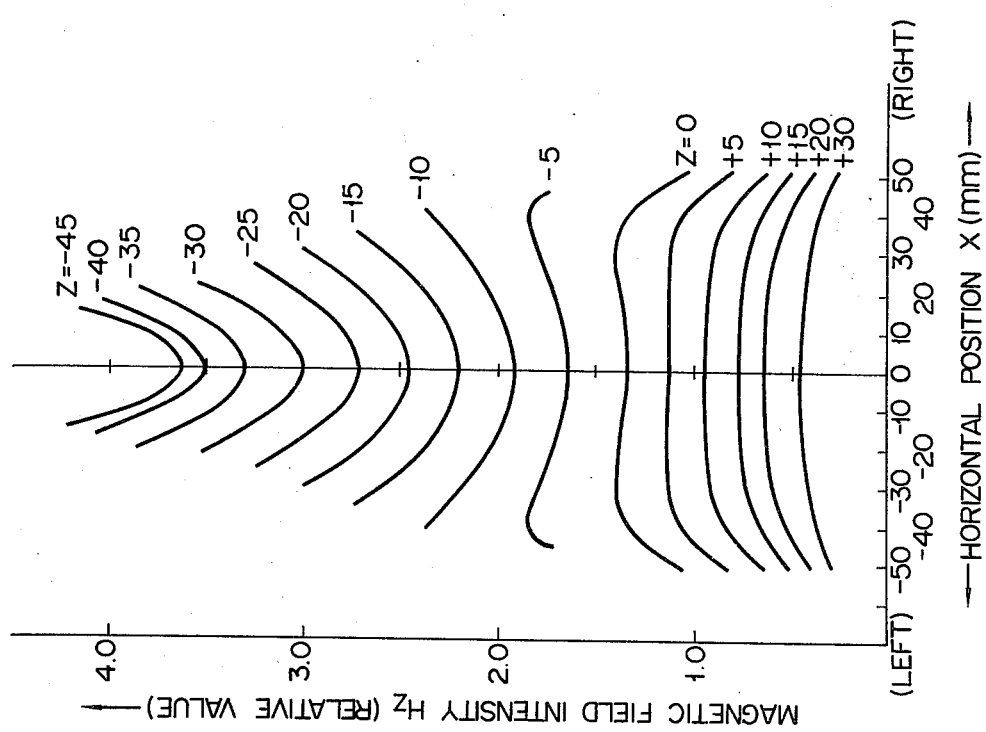
Figure 7B:
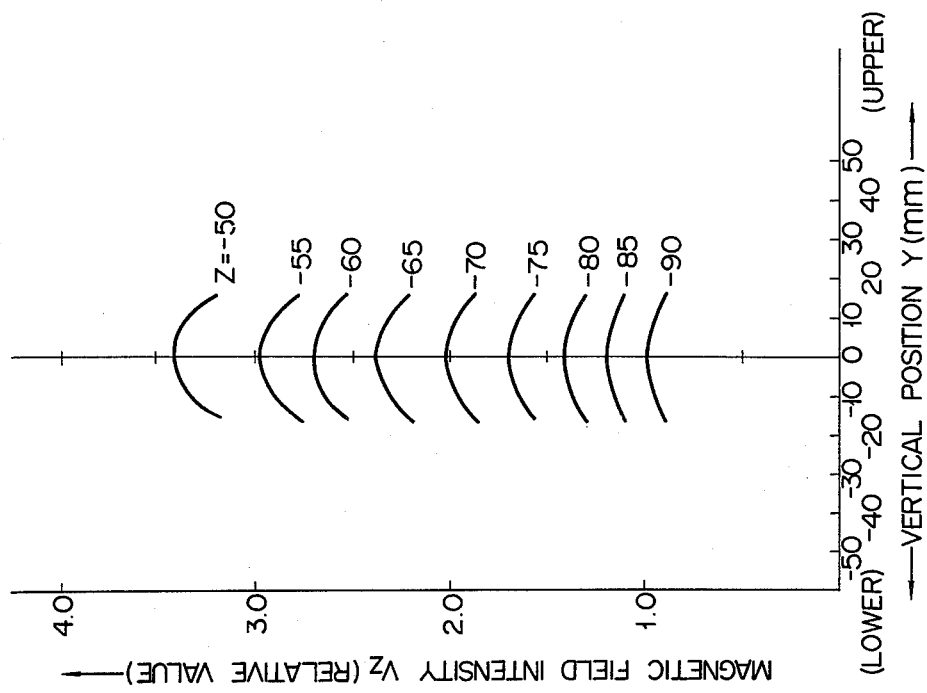
FIGS. 7A and 7B are curve diagrams of the distributions of deflection magnetic fields generated by the vertical deflection coil used in said embodiment.
Figure 7A:
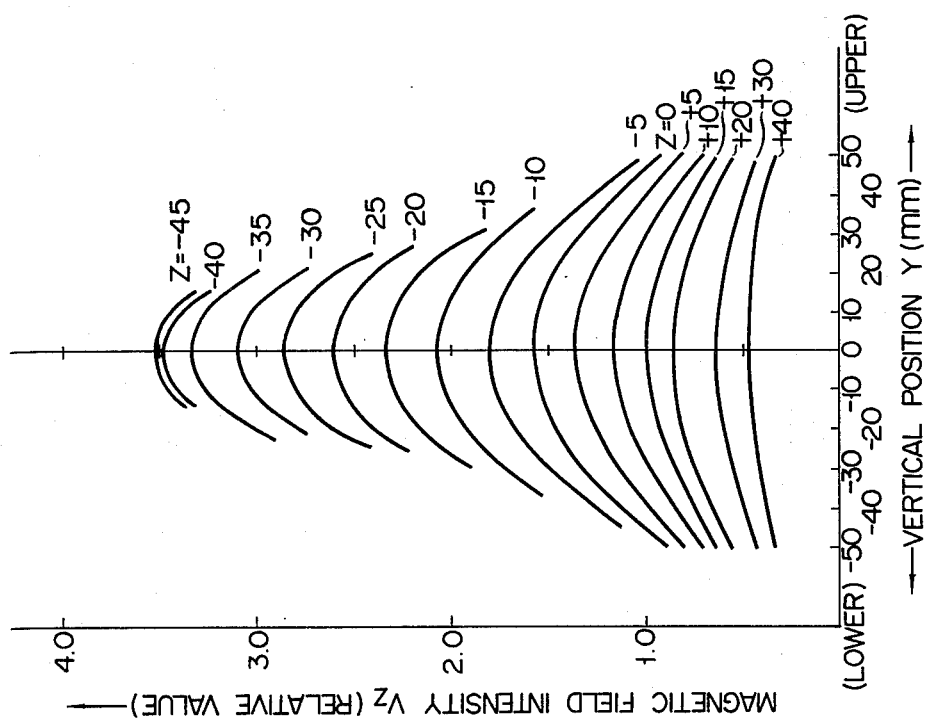

FIGS. 7A and 7B are curve diagrams of a magnetic field created by a vertical deflection coil. Throughout these figures, the position of the deflection yoke 15 shifting from its axis in the radial or vertical (upper to lower) direction is plotted on the abscissa, the intensity (relative value) of a magnetic field is plotted on the ordinate, and the position of the deflection yoke 15 shifting in the axial or Z axis direction is taken as a parameter. In FIGS. 7A and 7B, the same method as in FIGS. 6A and 6B is used to indicate the position on the Z axis of said vertical deflection coil.

Referring to FIGS. 6A and 6B, with $H_{oz}$ taken to denote the intensity on the Z axis of a magnetic field generated by the horizontal deflection coil and $x$ taken to represent the position of said coil removed from the Z axis in the horizontal direction, then the distribution $H_z$ of said magnetic field may be expressed by the following approximation formula:

$$H_z = H_{oz} + H_{2z}x^2$$

Referring now to FIGS. 7A and 7B, with $V_{oz}$ taken to show the intensity of a magnetic field produced by a vertical deflection coil and $y$ taken to indicate the position of said coil removed from the Z axis in the vertical direction, then the distribution $V_z$ of said magnetic field may be given by the following approximation formula:

$$V_z = V_{oz} + V_{2z}y^2$$

Figure 9:
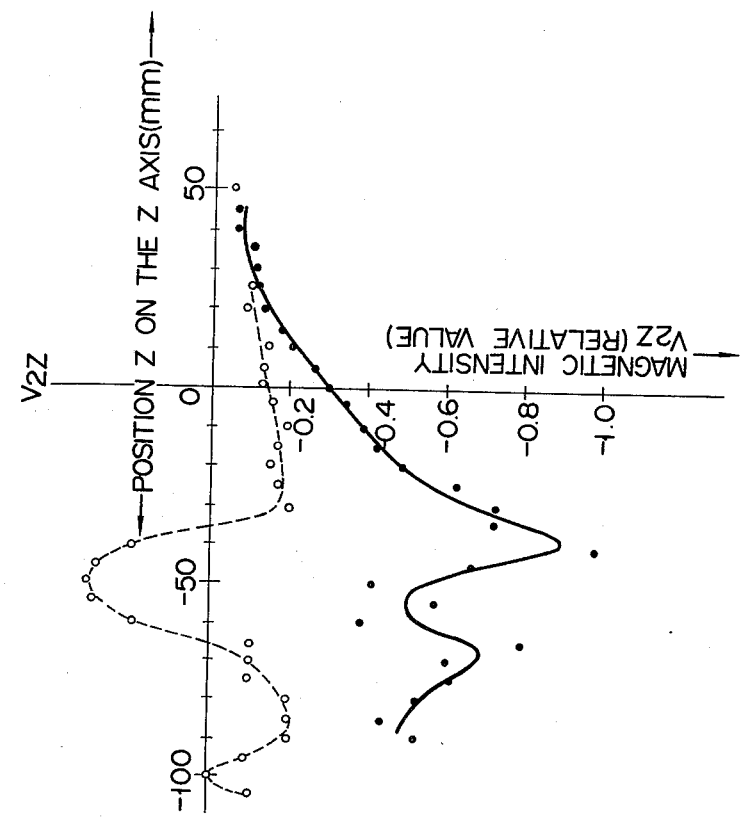
FIG. 9 is curve diagram comparing the intensity $V_{2z}$ (indicated in a solid line) of the distribution of the vertical deflection magnetic field of FIGS. 7A and 7B with the similar intensity $V_{2z}$ (shown in a broken line) provided by the prior art deflection yoke.
Figure 8:
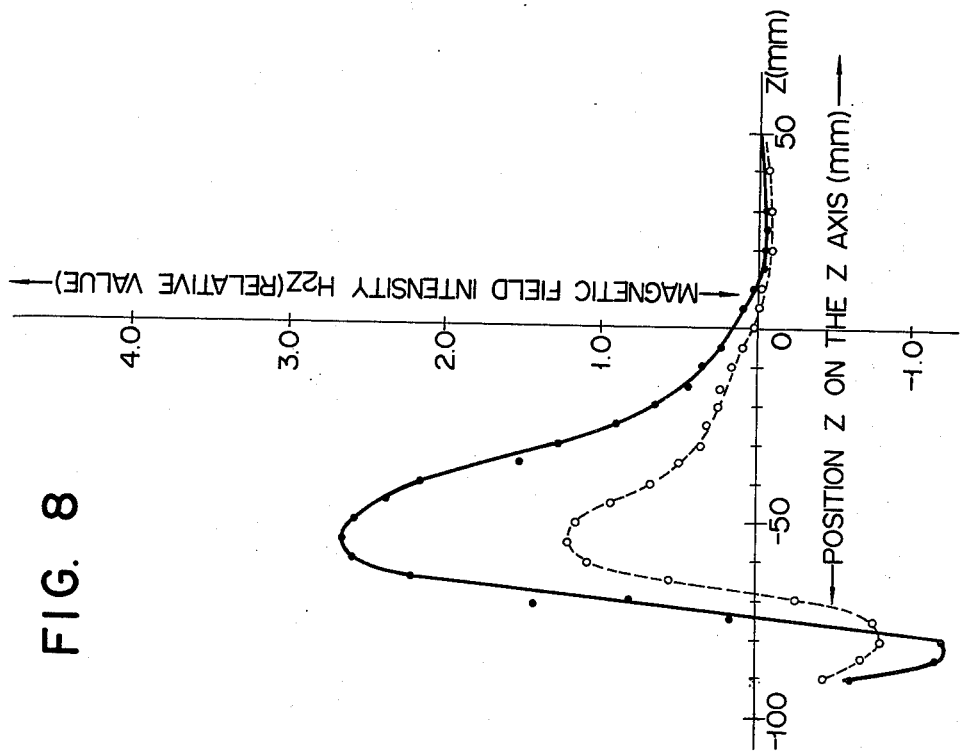
FIG. 8 is a curve diagram comparing the intensity $H_{2x}$ (indicated in a solid line) of the distribution of the horizontal deflection magnetic field of FIGS. 6A and 6B with the similar intensity $H_{2z}$ (shown in a broken line) produced by the prior art deflection yoke.

Where, in the above-mentioned formula, the coefficients $H_{2z}$ and $V_{2z}$ have a positive value, then a magnetic field presents a pincushion-shaped distribution, and where said coefficients $H_{2z}$ and $V_{2z}$ have a negative value, then a magnetic field displays a barrel-shaped distribution. With $H_{2z}$ taken to denote the function of Z (the position of a horizontal deflection coil on the Z axis), the distribution $H_{2z}$ of a magnetic field shown in FIGS. 6A and 6B will taken the form indicated by the solid line of FIG. 8. The broken line of FIG. 8 shows a similar distribution $H_{2z}$ occurring in the prior art deflection yoke. With $V_{2z}$ taken to represent the function of Z (the position of a vertical deflection coil on the Z axis), the distribution $V_{2z}$ of a magnetic field presented in FIGS. 7A and 7B may be represented by the solid line of FIG. 9. The broken line of FIG. 9 indicates a similar distribution $V_{2z}$ observed in the prior art deflection yoke.

As seen from FIG. 8, the deflection yoke 15 of this invention indicates a larger positive value when $H_{2z}$ is integrated in the Z axis direction than the prior art deflection yoke. Accordingly, a horizontal deflection magnetic field obtained from the subject deflection yoke 15 presents a far stronger pincushion shape as a whole than the prior art deflection yoke.

Figure 10:
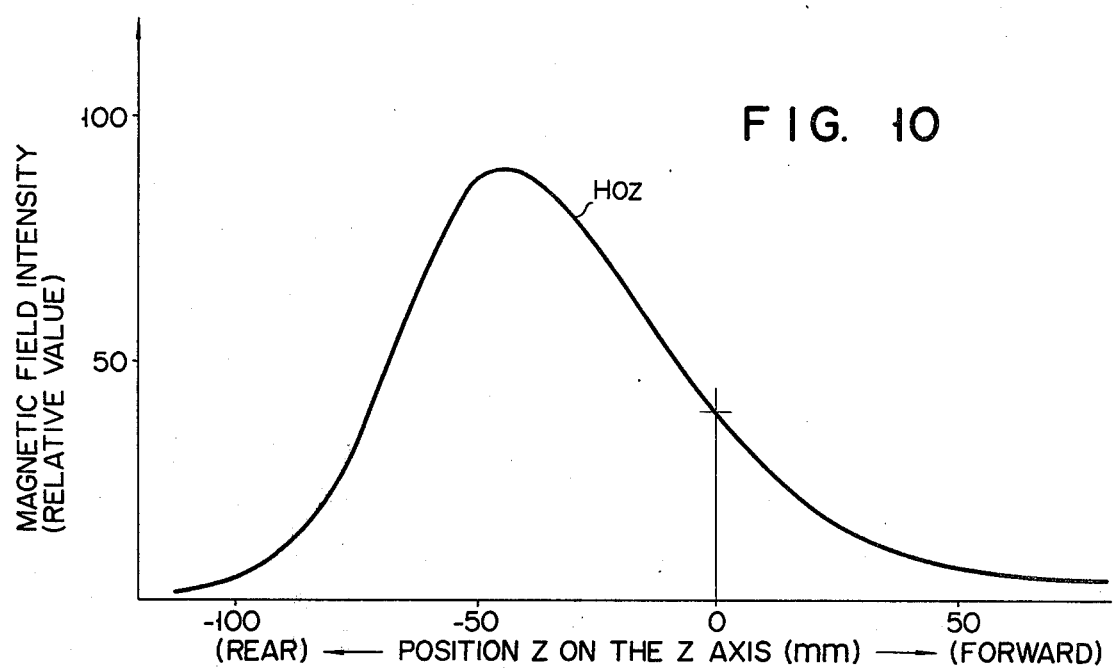
FIG. 10 is a curve diagram setting forth changes in the intensity of a horizontal deflection magnetic field appearing on the Z axis of the deflection yoke used in said embodiment.
Figure 11:
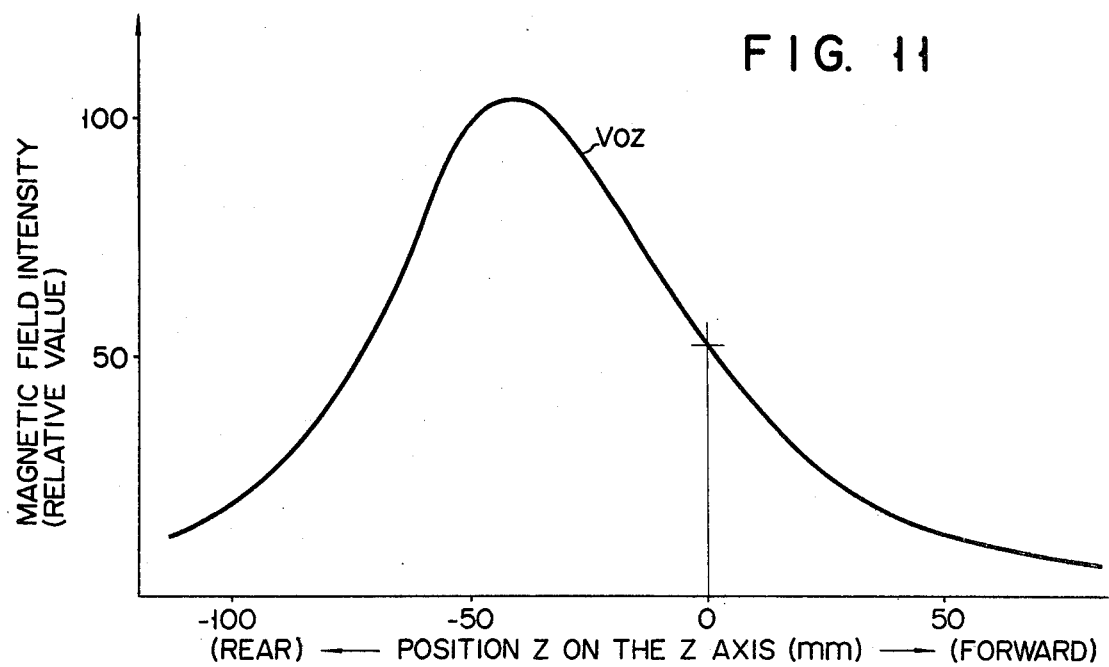
FIG. 11 is a curve diagram illustrating changes in the intensity of the vertical deflection magnetic field on the Z axis of the deflection yoke used in said embodiment.

The intensity $H_{oz}$ of a horizontal deflection magnetic field on the axis of the deflection yoke 15 or Z axis and the intensity $V_{oz}$ of a vertical deflection magnetic field on said Z axis present changes shown in FIGS. 10 and 11 respectively.

The three electron guns 14R, 14G, 14B of FIG. 1 are supplied with three primary color signals SR, SG, SB corresponding to the red, green and blue colors through the later described three primary color signal generator. Said generator consists of a primary color signal demodulator 16, delay circuits 17G, 17B and image signal amplifiers 18R, 18G, 18B. FIG. 12 sets forth the concrete arrangement of said primary color signal generator. As seen from FIGS. 1 and 12, the red primary color signal SR of the three primary color signals SR, SG, SB demodulated by the primary color signal demodulator 16 is amplified to a prescribed amplitude by the corresponding image signal amplifier 18R and then conducted to the electron gun 14R to modulate the electron beam ER. The green primary color signal SG is delivered to the delay circuit 17G to be delayed for a prescribed length of time tG and amplified to a prescribed amplitude by the corresponding image signal amplifier 18G and thereafter supplied to the electron gun 14G to modulate the electron beam EG. The blue primary color signal SB is transmitted to the delay circuit 17B to be delayed for a prescribed length of time tB and amplified to a prescribed amplitude by the corresponding image signal amplifier 18B and thereafter sent forth to the electron gun 14B to modulate the electron beam EB.

The delay time tG for which the green primary color signal SG is delayed by the delay cirucit 17G and the delay time tB for which the blue primary color signal SB is delayed by the delay circuit 17B are intended spatially to equalize the displacements of color images resulting from the intervening spacing D of the three electron beam spots on the fluorescent screen.

With $W_H$ (mm) taken to denote the horizontal length of the fluorescent membrane 12 and $f_H$ (Hz) taken to represent the frequency of a horizontal scanning signal, the abovementioned delay times tG, tB are chosen to satisfy the following formulas:

$$0.8/W_H f_H < tG < 0.65 \, d/W_H f_H \ldots \quad (2)$$

$$1.6/W_H f_H < tB < 1.3 \, d/W_H f_H \ldots \quad (3)$$

With the picture quality of a color television image, limits to discrimination, manufacturing cost, etc., taken into account, the above-mentioned delay times tG, tB are preferred to fall within the range of 0.15 to 1.5 microseconds.

The delay circuits 17G, 17B of FIG. 12 are each of the type using an LC delay line provided with intermediate taps. FIG. 13 shows the delay circuits 17G, 17B of FIG. 12 with part thereof simplified. The parts of FIG. 13 the same as those of FIG. 12 are denoted by the same numerals. Referring to FIG. 13, referential numerals 21G, 21B are delay lines; referential numerals 22G, 22B are input-matching impedance elements; and referential numerals 24Ga to 24Gd and 24Ba to 24Bd are a plurality of intermediate taps arranged at an equal interval from the output sides of the delay lines 21G, 21B respectively. Referential numerals 25G, 25B are intermediate tap switches and referential numerals 26G, 26B are buffer elements. The intermediate taps 24Ga to 24Gd and 24Ba to 24Bd are intended to minimize any slight change in the required delay time caused by minute changes in the precision with which the electron guns 14R, 14G, 14B are assembled in the color television receiving tube and also by fine variations in the distributions of magnetic fields created by the deflection yoke 15. Where, therefore, the above-mentioned various deviations are proved to be so negligible as to exert no practical effect, it is not always necessary to provide said intermediate taps. The delay time $t_T$ provided by the respective intermediate taps is determined by allowable limits to the displacement of the primary color images appearing on the fluorescent membrane 12, namely, should be chosen to satisfy the formula:

$$t_T < 1/W_H f_H$$

For briefness, reference to the delay circuits 17G, 17B is temporarily omitted in describing the operation of the color television receiver of this invention having the above-mentioned arrangement. The three primary color signals SR, SG, SB demodulated by the demodulator 16 are amplified by the image signals amplifiers 18R, 18G, 18B and then delivered to the electron guns 14R, 14G, 14B at the same time. Thus, the three electron beams ER, EG, EB emitted from the electron guns 14R, 14G, 14B are modulated by the corresponding primary color signals SR, SG, SB and then discharged on to the fluorescent membrane 12. Since the convergence point of the three electron beams ER, EG, EB is chosen to fall outside of the fluorescent membrane, the two side electron beams ER, EB are set apart at an interval D from the central electron beam EG. While being deflected by the deflection yoke 15 in both horizontal and vertical directions, the three electron beams ER, EG, EB scan the surface of the fluorescent membrane 12. Since the convergence point of said electron beams ER, EG, EB falls outside of the fluorescent membrane 12, a distance between the beam-emitting ends of the three electron guns 14R, 14G, 14B and the focal point of the three electron beams ER, EG, EB is made considerably long. Where, therefore, the peripheral portions of the fluorescent screen are scanned, as shown in FIG. 14A, by the three electron beams ER, EG, EB deflected in the horizontal direction, then the intervening spacing D' of the three electron beam spots in the peripheral portions of the fluorescent screen and the intervening spacing D of said spots in the central portion of the fluorescent screen are approximately equal. Therefore, the difference in this respect between the Braun tube of the present invention and that of the prior art shown in FIG. 15A is obvious. Since the horizontal deflection magnetic field shows a pincushion-shaped distribution and the vertical deflection magnetic field presents a barrel-shaped distribution, the loci of the forward ends of the three electron beams ER, EG, EB on the fluorescent membrane 12 are aligned, as shown in FIG. 14B, in a straight line LH in the horizontal direction of said membrane 12 with respect to the horizontal line portions of a color television image and form three almost equidistantly spaced lines LV in the vertical direction of said membrane 12 with respect to the vertical line portions of said color television image. With the prior art Braun tube, however, the above-mentioned loci of the forward ends of the three electron beams ER, EG, EB are distorted as seen from FIG. 15B. Under the condition where the loci of the forward ends of the three electron beams ER, EG, EB indicate such a form as shown in FIG. 14B, the color television images resulting from scanning by said electron beams ER, EG, EB present the displacement of each color images, as naturally expected. In practice, however, the delay circuits 17G, 17B are provided as shown in FIG. 1. Therefore, the green primary color signal SG is delayed by the delay circuit 17G for a delay time tG corresponding to the spacing D between the red and green electron beam spots ER, EG on the fluorescent membrane 12. Similarly, the blue primary color signal SB is delayed by the delay circuit 17B for a delay time tB (=2 tG) corresponding to the spacing 2D between the red and blue electron beam spots ER, EB on the fluorescent membrane 12. Accordingly, the vertical line portions of a color television image derived from scanning by the three electron beams ER, EG, EB attain a spatial coincidence. Namely, referring to a single fluorescent dot, the point of time at which the electron beam EG passes over said dot is delayed by tG from that of the foremost electron beam ER, and the point of time at which the electron beam EB is carried over said dot is delayed by tB (=2 tG) from that of said foremost electron beam ER. Therefore, the three electron beams ER, EG, EB apply the required modulation on the abovementioned fluorescent dot at the respective points of time at which said beams ER, EG, EB pass over said dot, causing the three primary color images to attain a spatial coincidence. What is important in this connection is that since, as previously mentioned, the loci of the forward ends of the three electron beams ER, EG, EB on the fluorescent membrane 12 are aligned in a straight line in the horizontal direction of said membrane 12 with respect to the horizontal line portions of a color television image and indicate three almost equidistantly spaced lines in the vertical direction of said membrane 12 with respect to the vertical line portions of said image, the delay times tG, tB (=2 tG) for which the two green and blue primary color signals SG, SB are delayed are made equal in both central and peripheral portions of the fluorescent screen. Accordingly, any delay circuit will serve the purpose if it always provides a fixed delay time during operation, thereby admitting of its simple arrangement. This is also the case with a broad angle Braun tube whose deflection angle is set at 110° or over.

Figure 17:
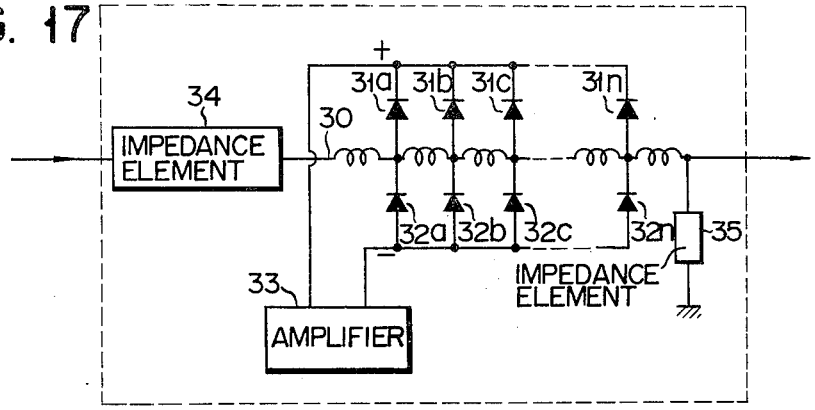

This invention is not limited to the foregoing embodiment. but may be practised in many other modifications as later described. Though, in said embodiment, the three electron beams were used in scanning in the order of ER, EG, EB, this order may be optionally changed. Further, according to said embodiment, only two green and blue primary color signals SG, SB were delayed while the red primary color signal SR was not delayed at all. However, it is possible, if necessary, to delay said red primary color signal SR. In such case, it is advised to delay the other two green and blue primary color signals SG, SB further for a prescribed length of time from said SR signal. The point is that delay be so effected as to cause color television images derived from scanning by the three electron beams ER, EG, EB to attain a spatial coincidence. Further according to said embodiment, there were used three separate electron guns. However, it is possible to assemble said electron guns into an integral type, provided said integral type is designed to emit the three electron beams ER, EG, EB modulated by the three primary color signals SR, SG, SB respectively in such a manner that the electron beam spots are aligned in a straight line in the horizontal direction of the fluorescent screen, namely, set in the so-called "in-line" arrangement. Moreover, the horizontal and vertical deflection coils constituting the deflection yoke 15 need not be of the saddle and toroidal types respectively, but may have the opposite forms of winding. Further, both deflection coils can be of the saddle or toroidal type alike. The point is that the horizontal and vertical deflection coils be so designed as to create magnetic fields whose distributions set forth pincushion and barrel shapes respectively, whether said coils are of the saddle or toroidal type. In the foregoing embodiment, the primary color signal generator was the type whose primary color signal demodulator 16 was designed to generate three primary color signals SR, SG, SB. However, said primary color signal demodulator 16 may produce color difference signals SR-SY, SG-SY, SB-SY (where the character SY denotes a luminance signal). FIG. 16 shows a concrete circuit arrangement for the last mentioned case. The delay circuit is not limited to the type shown in FIG. 12, but may be of any other type as described below. The delay circuit of FIG. 17 is a type consisting of a voltage controlled continuously variable delay line 30 using variable capacity diodes 31a to 31n and 32a to 32n as capacity elements for an LC type delay line. Referential numeral 53 of FIG. 17 is a balanced type controlled amplifier, which supplies the above-mentioned diodes with a prescribed voltage for control of their capacities. Reference numeral 34 is an input-matching impedance element, and referential numeral 35 denotes an output terminal impedance element. A maximum delay time provided by the delay line 30 is defined by tG or tB given in the aforesaid inequality formulas (2) or (3). Variation in the delay time results from the degree of precision with which the electron guns 14R, 14G, 14B are assembled together in a color television receiving tube and minute changes in the distributions of magnetic fields created by the deflection yoke 15.

Figure 18:
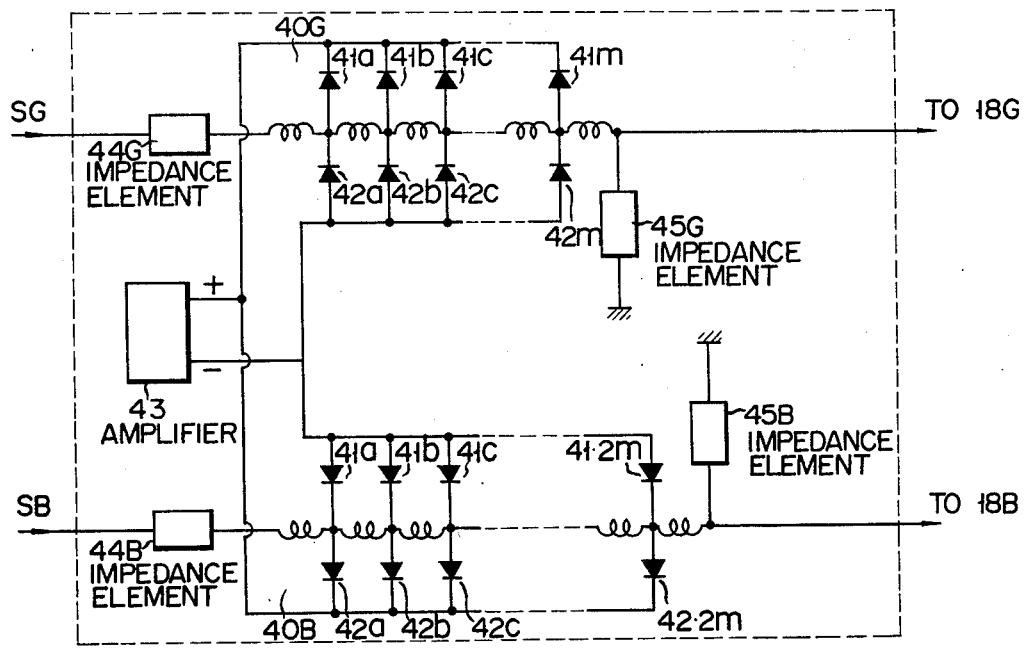

The composite delay circuit of FIG. 18 is formed by integrating two units of the delay circuit of FIG. 17 which are designed to provide delay times satisfying the values of tG and tB given in the previously mentioned inequality formulas (2), (3). While the delay lines 40G, 40B are formed of the same elements, the delay line 40G has an $m$ number of serially arranged delay elements and the delay line 40B contains a $2m$ number of serially arranged delay elements. Therefore, the maximum delay times of both delay lines 40G, 40B bear the ratio of 1:2. What deserves notice in this case is that the variable capacity diodes 41a to 41m of the delay line 40G and the variable capacity diodes 41a to $41_{2m}$ of the delay line 40B are jointly controlled by a common balanced type controlled amplifier 43. Therefore, the composite delay circuit of FIG. 18 has the advantage over a type formed simply by combining two separate units of the delay circuit of FIG. 17 in that the circuit arrangement can be simplified. In FIG. 18, referential numerals 44G, 44B are input-matching impedance elements and referential numerals 45G, 45B are output terminal impedance elements.

Figure 19:
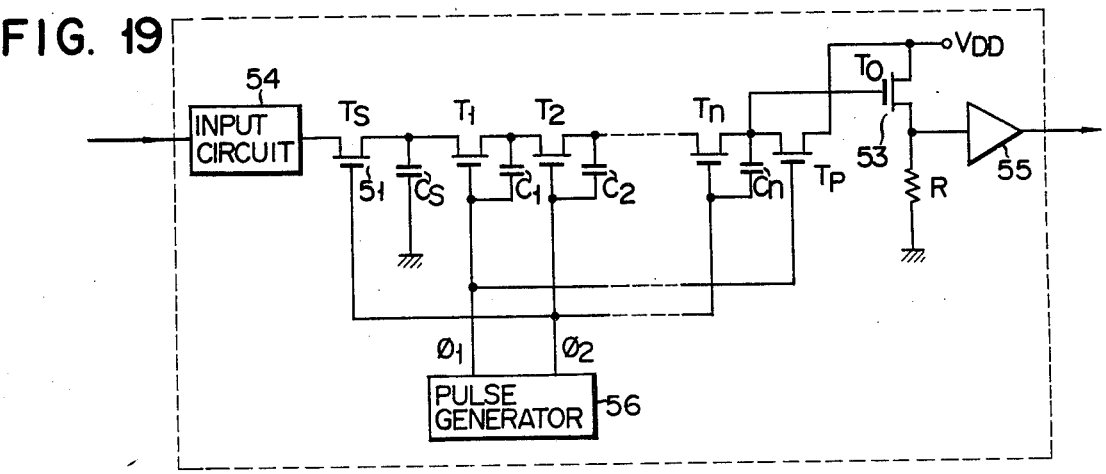

The delay circuit of FIG. 19 is the type consisting of, for example, an $n$ number of serially arranged MOS BBD's (bucket brigade devices) included in the delay circuits whose delay elements are constituted by charge transfer elements (CTD) such as BBD or CCD units. As is well known, the MOS BBD's serially arranged in an n number comprise an input sampling section 51 formed of a transistor Ts and capacitor Cs, a bucket brigade transfer section 52 consisting of transistors $T_1$ to $T_n$ and capacitors $C_1$ to $C_n$ and a source follower output section 53 composed of a precharge transistor $T_P$, transistor $T_O$ and resistor R. Referential numeral 54 of FIG. 19 is the input circuit of the BBD's and includes, for example, a bias-setting circuit. Referential numeral 55 is the output circuit of the BBD's and includes a transfer pulse-eliminating circuit and an output amplifier. Referential numeral 56 is a transfer pulse generator.

It will be noted that the number $n$ of serially arranged charge transfer elements should satisfy the following formula:

$$\frac{0.8 \cdot p \cdot fcp}{W_H \cdot f_H} < n < \frac{0.65d \cdot p \cdot fcp}{W_H \cdot f_H}$$

where the delay circuit of FIG. 19 constitutes the delay circuit 17G of FIG. 1, and also the following formula:

$$\frac{1.6 \cdot p \cdot fcp}{W_H \cdot f_H} < n < \frac{1.35d \cdot p \cdot fcp}{W_H \cdot f_H}$$

where the delay circuit of FIG. 19 is used as the delay circuit 17B of FIG. 1. Throughout the above formulas, the term fcp denotes that of the transfer frequencies of the charge transfer elements which is higher than the maximum frequency of an image signal and the term p indicates a constant defined by the construction of the charge transfer elements or the number in which they are provided to match the phase number of a transfer pulse. In the case of the delay circuit of FIG. 19 which is operated in two phases, $\phi 1$, $\phi 2$, the term $p$ denotes 2.

Figure 20:
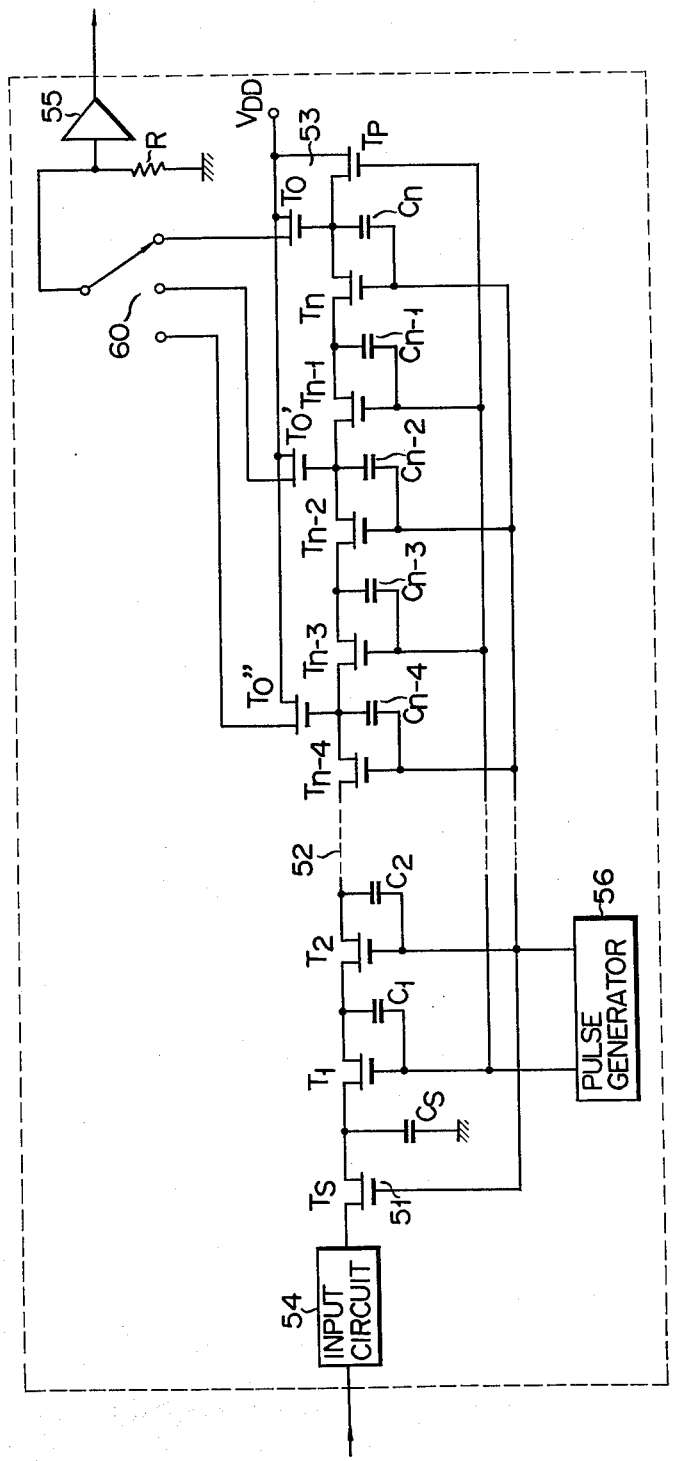

The delay circuit of FIG. 20 is the type constructed by fitting the delay circuit of FIG. 19 with a tap-type delay time change-correcting device. The delay circuit of FIG. 20 has a source follower output transistor $T_O$ positioned in the BBD element occupying the n order and also a plurality of source follower transistors $T_O'$, $T_O''$ to conduct signals from intermediate BBD elements (for example, those taking the $n-2$ order and $n-4$ order) to the outside, thereby selectively using signals from said transistors $T_O'$, $T_O''$ according to the magnitude of variation in the delay time, namely, the amount of required correction, by selectively drawing out said signals through the changeover operation of the switch 60. A delay time $t_T'$ taking place between two adjacent source follower output transistors is determined in consideration of an allowable limit to color phase irregularities appearing on the fluorescent surface. With $n'$ taken to denote the number of serially arranged charge transfer elements disposed between the respective transistors, fcp to show a transfer frequency and p to indicate the phase of a transfer pulse, the delay time should have a value expressed by the following formula:

$$t_T' = \frac{n'}{p \cdot fcp} < \frac{1}{W_H \cdot f_H}$$

With the delay circuit of FIG. 20, the number of the serially arranged charge transfer elements which are used in said charge transfer is adjusted according to the magnitude of variation in the delay time. Therefore, the charge transfer frequency may be fixed. If, in this case, the multiplication and division of frequency is carried out by application of signals of stable frequency such as the color subcarrier and synchronizing pulses of the NTSC signal and also the transfer pulses delivered from the charge transfer elements are properly shaped, then it is possible to attain a very stable delay operation and simplify the circuit arrangement of the transfer pulse generator, thus prominently contributing to the low cost manufacture of the apparatus of this invention as a whole.

Figure 21:
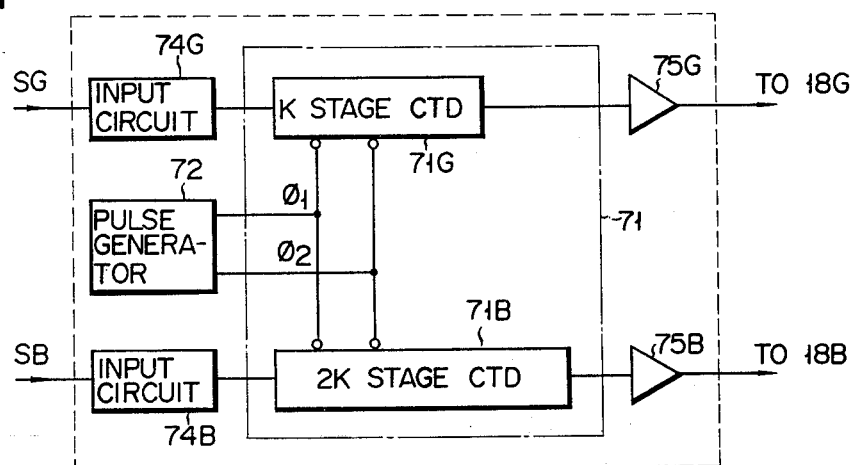

The delay circuit of FIG. 21 consists of an integral combination of two units of the delay circuit of FIG. 19 and is designed to provide such delay times as satisfy the terms tG, tB of the aforesaid inequality formulas (2), (3). The delay circuit of FIG. 21 is formed of a pair of 2-phase driven charge transfer elements 71G, 71B integrated in a monolithic form. One 2-phase driven charge transfer element 71G is used as the delay circuit 17G of FIG. 1 and consists of a K number of serially arranged delay elements, and the other 2-phase charge transfer element 71B is used as the delay circuit 17B of FIG. 1 and consists of a 2K number of serially arranged delay elements. Both charge transfer elements are driven by transfer pulses $\phi1$, $\phi2$ sent forth by a single transfer pulse generator 72. Referential numerals 74G, 74B are BBD input circuits including biassetting elements. Referential numerals 75G, 75B are BBD output circuits each including a transfer pulse eliminating circuit and output amplifier. In this case, the K number of said serially arranged charge transfer elements should satisfy a value expressed by the following formula:

$$\frac{0.8 \cdot p \cdot fcp}{W_H \cdot f_H} < K < \frac{0.65 d \cdot p \cdot fcp}{W_H \cdot f_H}$$

Figure 22:
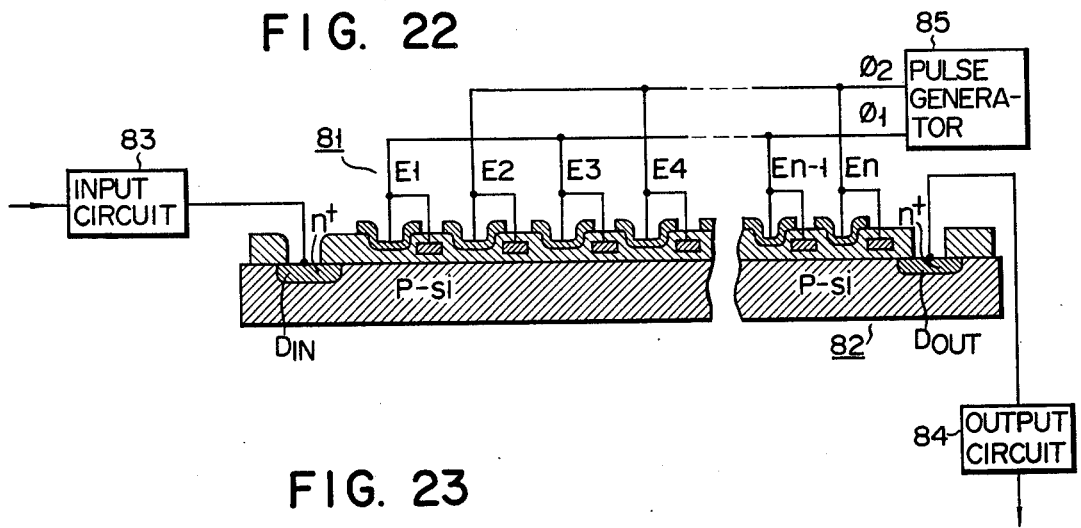

The delay circuit of FIG. 22 is a 2-phase driven charge coupled device (CCD) having an $n$ number of serially arranged delay elements. As is well known, this CCD comprises silicon oxide membranes deposited on a P-type silicon substrate with their thicknesses changed alternately, transfer electrodes $E_1$ to $E_n$ mounted on said oxide membranes, signal input section 81 consisting of an input diode $D_{IN}$ and signal output section 82 formed of an output diode $D_{OUT}$. Referential numeral 83 is a CCD input circuit, 84 a CCD output circuit, and 85 a transfer pulse generator. In said CCD, all alternate transfer electrodes constituting one group are formed on the corresponding oxide membranes having one kind of thickness and electrically connected. All alternate transfer electrodes constituting the other group are formed on the corresponding oxide membranes having another kind of thickness and electrically connected. These two groups of transfer electrodes are supplied with 2-phase transfer pulses $\phi1$, $\phi2$ respectively by a transfer pulse generator 85. The input diode $D_{IN}$ and output diode $D_{OUT}$ are biased in the backward direction, so as to respectively undertake the supply and withdrawal of electric charges corresponding to said transfer pulses. Where the delay circuit of FIG. 22 is used as the delay circuit 17G or 17B of FIG. 1, it is necessary to specify the number of delay elements constituting said delay circuit as in the case where the BBD of FIG. 19 is used for the same purpose.

With a delay circuit using charge transfer elements as delay elements, it is necessary to set the number of serially arranged charge transfer elements within the following range according to the kind of primary color signal being delayed. Namely, with respect to an electron beam (for example, EG) scanning the fluorescent screen of a color television receiving tube for the second time as counted in the direction of scanning, the number of serially arranged charge transfer elements constituting the delay circuit required to delay the corresponding primary color signal for a prescribed length of time in order to modulate said electron beam EG should be chosen to be larger than $0.8\, p.fcp/W_H.f_H$ and smaller than $0.65 d.p.fcp/W_H.f_H$. Further with respect to an electron beam (for example EB) scanning the fluorescent screen of the color television receiving tube for the third time as counted in the direction of scanning, the number of serially arranged charge transfer elements constituting the delay circuit required to delay the corresponding primary color signal for a prescribed length of time in order to modulate said electron beam EB should be chosen to be larger than $1.6.p.fcp/W_H.f_H$ and smaller than $1.3 d.p.fcp/W_H.f_H$. Throughout the above-mentioned formulas, $p$ is the phase number of a pulse driving the charge transfer element, $fcp$(Hz) the frequency of said pulse, $W_H$(mm) the horizontal length of the fluorescent screen of the color television receiving tube, $f_H$(Hz) the frequency of a horizontal scanning signal supplied to the deflection yoke, and $d$(mm) the intervening spacing of the three electron beams at the discharge ends of the three electron guns. The above-mentioned scanning order is defined to mean the time sequence in which each of the three electron beams reaches a given point on the fluorescent screen.

Adjustment of the transfer frequency of the charge transfer elements constituting the delay circuit has the advantage of easily correcting variations in the prescribed delay time resulting from the inaccurate precision with which the electron guns 14R, 14G, 14B were initially assembled in the color television receiving tube and also from minute changes in the distributions of magnetic fields created by the deflection yoke 15.

Figure 23:
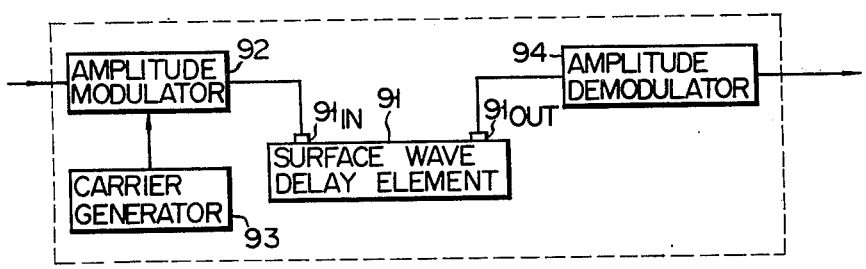

The delay circuit of FIG. 23 consists of a surface wave delay element. Referential numeral 91 denotes said surface wave delay element, 92 an amplitude modulator, 93 a carrier generator, and 94 an amplitude demodulator. With the delay circuit of FIG. 23, a carrier delivered from the carrier generator 93 is subjected to amplitude modulation by a primary color signal SG or SB in the amplitude modulator 92. The modulated carrier is conducted to the input terminal $91_{IN}$ of the surface wave delay element 91, delayed while being carried through said surface wave delay element 91, and finally drawn out of the output terminal $91_{OUT}$ of said element 91. Thereafter the modulated carrier is demodulated by the amplitude demodulator 94 to the original primary color signal. Where the delay circuit of FIG. 23 is used as the delay circuit 17G or 17B of FIG. 1, the delay time provided by the surface wave delay element 91 should obviously satisfy the value of tG or tB given in the aforesaid inequality formula (2) or (3). Adjustment of the frequency of a carrier produced by the carrier generator 93 can correct variations in the prescribed delay time resulting from the inaccurate precision with which the three electron guns 14R, 14G, 14B were initially assembled in the color television receiving tube and also from minute changes in the distributions of magnetic fields generated by the deflection yoke 15.

Figure 24:
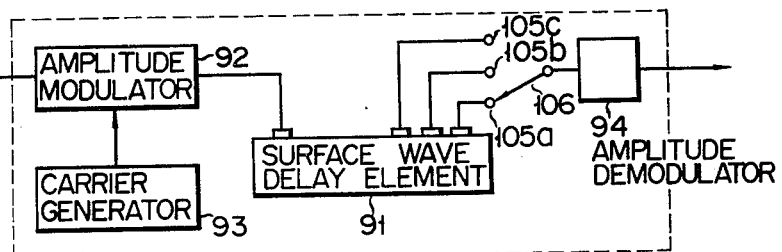

The delay circuit of FIG. 24 is a modification of that of FIG. 23 formed by adding a device for correcting variations in the prescribed delay time. With the delay circuit of FIG. 24, three output terminals 105a, 105b, 105c, for example, are equidistantly provided on the surface wave element 91 in the direction of signal transmission. These output terminals 105a, 105b, 105c are selectively connected to an amplitude demodulator by the changeover operation of a switch 106, thereby enabling variations in the prescribed delay time to be corrected by adjusting the effective length of the surface wave delay element 91. In this case, too, the intervening space of said three output terminals 105a, 105b, 105c is determined by an allowable limit to color phase irregularities appearing on the fluorescent screen.

Figure 25:
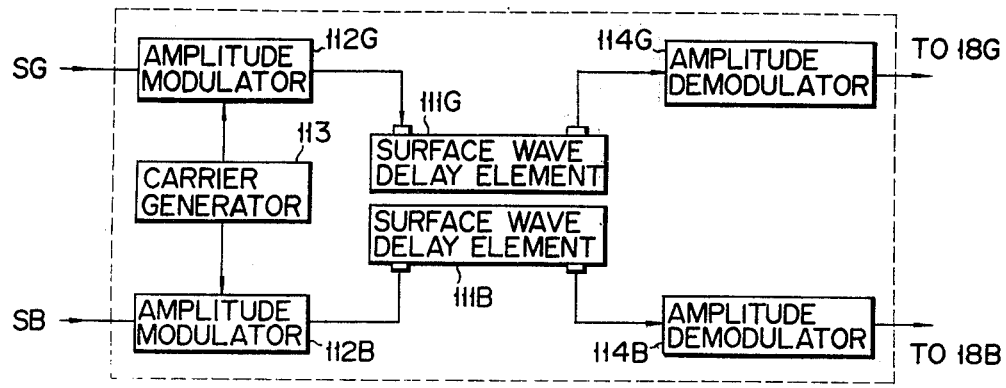

The delay circuit of FIG. 25 is the type in which a pair of surface wave delay elements 111G, 111B have effective lengths bearing the ratio of 1:2; a single carrier generator 113 supplies a common carrier to two amplitude modulators 112G, 112B; and output signals from said surface wave delay elements 111G, 111B are transmitted to amplitude demodulators 114G, 114B respectively.

What we claim is:

1. In a color television receiver having a color television receiving tube with three electron guns having beam-emitting ends to emit three electron beams, and means to modulate each of the three electron beams with a corresponding one of the three primary color television signals applied to the television receiver for impingement onto the fluorescent screen of the television receiving tube, the improvement comprising:
   a horizontally spaced arrangement of the three electron guns configured to emit one central electron beam and two side electron beams converging at a point outside of the fluorescent screen,
   a deflection yoke associated with the color television receiving tube to provide for scanning of the fluorescent screen by the three electron beams, operative to cause a horizontal deflection magnetic field created by said yoke to have a pincushion-shaped distribution, and a vertical deflection magnetic field produced by said yoke to have a barrel-shaped distribution,
   a delay circuit for causing at least two of the said three primary color television signals which modulate the electron beams to be successively delayed from each preceding one for a prescribed length of time, corresponding to the intervening spacing of the three electron beams impinging onto the fluorescent screen,
   the color television receiving tube being designed such that with $d$ (mm) designating the intervening spacing of the three electron beams at the beam-emitting ends of the three electron guns, $L$ (mm) designating the distance from the beam-emitting end of each electron gun to the fluorescent screen, and $\theta$ (radian) designating the angle defined by each of the two side electron beams and the central electron beam, the difference $d-L\theta$ is larger than $d/6$ and smaller than $d/2$.

2. The color television receiver improvement according to claim 1, wherein the three electron beams impinging on the fluorescent screen of the color television receiving tube are equidistantly spaced; and two of the three primary color signals for modulating those of the three electron beams which carry out scanning for the second and third times are delayed from the foremost primary color signal for modulating the electron beam which carries out scanning for the first time for prescribed lengths of time bearing the ratio of 1:2.

3. The color television receiver improvement according to claim 1, wherein the delay circuit is so designed that with $W_H$ (mm) taken to denote the horizontal length of the fluorescent screen, $f$ (Hz) to indicate the frequency of a horizontal scanning signal supplied to the deflection yoke, and $d$ (mm) to represent the intervening spacing of the three electron beams at the beam-emitting ends of the three electron guns, then the primary color signal for modulating that of the three electron beams which scans the fluorescent screen for the second time is delayed from the preceding primary color signal for a prescribed length of time larger than $0.8/W_H.f_H$ and smaller than $0.65\ d/W_H.f_H$, and the primary color signal for modulating that of the three electron beams which scans the fluorescent screen for the third time is delayed from the preceding primary color signal for a prescribed length of time larger than $1.6/W_H.f_H$ and smaller than $1.3\ d/W_H.f_H$.

4. The color television receiver improvement according to claim 1, wherein the delay circuit is so designed that with $W_H$ (mm) taken to denote the horizontal length of the fluorescent screen of the color television receiving tube and $f_H$ (Hz) to indicate the frequency of a horizontal scanning signal supplied to the deflection yoke, the delay time can be adjusted at the rate of a smaller time width than $1/W_H.f_H$.

5. The color television receiver improvement according to claim 1, wherein the delay circuit consists of two groups of charge transfer elements acting as delay elements for successively delaying the second and third primary color signals for modulating those of the three electron beams which scan the fluorescent screen for the second and third times respectively at the rate of a prescribed length of time corresponding to the intervening spacing of the three electron beams impinging on the fluorescent screen, and with $p$ taken to denote the phase number of a pulse for driving said charge transfer elements, $fcp$ (Hz) to indicate the frequency of said pulse, $W_H$(mm) to represent the horizontal length of the fluorescent screen of the color television receiving tube, $d$ (mm) to show the intervening spacing of the three electron beams at the beam-emitting ends of the three electron guns, and $f_H$ (Hz) to designate the frequency of a horizontal scanning signal supplied to the deflection yoke, then the number of serially arranged charge transfer elements used to delay said second primary color signal for a prescribed length of time is chosen to be larger than $0.8.p.fcp/W_H.f_H$ and smaller than $0.65\ d.p.fcp/W_H.f_H$, and the number of serially arranged charge transfer elements used to delay said third primary color signal for a prescribed length of time is defined to be larger than $1.6p.fcp/W_H.f_H$ and smaller than $1.3\ d/p.fcp/W_H.f_H$.

* * * * *